(12) United States Patent
Isono

(10) Patent No.: US 7,839,274 B2
(45) Date of Patent: Nov. 23, 2010

(54) TIRE RISK JUDGING DEVICE OF WHEEL ASSEMBLY FOR VEHICLE

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 398 days.

(21) Appl. No.: 11/915,036

(22) PCT Filed: May 15, 2007

(86) PCT No.: PCT/JP2007/060316

§ 371 (c)(1),
(2), (4) Date: Nov. 20, 2007

(87) PCT Pub. No.: WO2007/138899

PCT Pub. Date: Dec. 6, 2007

(65) Prior Publication Data

US 2010/0001852 A1   Jan. 7, 2010

(30) Foreign Application Priority Data

May 31, 2006   (JP) .............................. 2006-151815

(51) Int. Cl.
B60C 23/00 (2006.01)
B60C 23/02 (2006.01)
G01M 3/04 (2006.01)

(52) U.S. Cl. .................. 340/442; 340/426.33; 340/447; 73/146; 73/45; 73/48

(58) Field of Classification Search ........................ None
See application file for complete search history.

(56) References Cited

U.S. PATENT DOCUMENTS 7,236,892 B2 * 6/2007 Ogawa .......................... 702/35
7,388,478 B2 * 6/2008 Watabe ........................ 340/442
2005/0242936 A1   11/2005 Watabe
2006/0010961 A1 * 1/2006 Gibson et al. ................. 73/40
2006/0102268 A1 * 5/2006 Loewe ........................ 152/415

(Continued)

FOREIGN PATENT DOCUMENTS

DE   199 44 391   10/2000

(Continued)

*Primary Examiner*—Daniel Wu
*Assistant Examiner*—Fekadeselassie Girma
(74) *Attorney, Agent, or Firm*—Oblon, Spivak, McClelland, Maier & Neustadt, L.L.P.

(57) ABSTRACT

A tire risk judging device of a wheel assembly for a vehicle includes a pressure sensor detecting air pressure of a tire air chamber, an air pressure-generating device that can supply pressurized air to the tire air chamber, an electronic control unit, and an instrument panel display unit. The electronic control unit computes a supply airflow rate supplied from the air pressure-generating device to the tire air chamber between the present location and a specified location, computes a leakage airflow rate leaked from the tire air chamber between the present location and the specified location, computes air pressure in the specified location of the tire air chamber based on air pressure in the present location of the tire air chamber, the supply airflow rate, and the leakage airflow rate, and judges tire risk in the specified location based on the air pressure in the specified location of the tire air chamber.

14 Claims, 6 Drawing Sheets

U.S. PATENT DOCUMENTS

2007/0187015 A1* 8/2007 Alff .......................... 152/418
2008/0209995 A1* 9/2008 Taylor et al. .................. 73/146

FOREIGN PATENT DOCUMENTS

| EP | 0 166 123 | 1/1986 |
| EP | 0 601 556 | 6/1994 |
| EP | 1 586 467 | 10/2005 |
| JP | 4-50162 | 11/1992 |
| JP | 07-137515 | 5/1995 |
| JP | 2002-120529 | 4/2002 |
| JP | 2003-320826 | 11/2003 |
| JP | 2004-001671 | 1/2004 |
| JP | 2005-212669 | 8/2005 |

* cited by examiner

TIRE RISK JUDGING DEVICE OF WHEEL ASSEMBLY FOR VEHICLE

TECHNICAL FIELD

The present invention relates to a tire risk judging device of a wheel assembly for a vehicle. More specifically, the present invention relates to a tire risk judging device which can judge tire risk (risk causing serious damage to a tire) in a specified location when the vehicle drives from the present location to the specified location.

BACKGROUND ART

A device of a wheel assembly for a vehicle giving an alarm to an occupant when a tire risk judged result is "there is risk" is disclosed, for example, in Japanese Utility Model Application Publication No. Hei 4-50162 (hereinafter referred to as Patent Document 1).

A tire air pressure controller described in the Patent Document 1 has airflow rate detection means for detecting an airflow rate supplied from an air pressure source including an air pump to a tire air chamber of a wheel assembly via a stop valve to output a signal corresponding to the airflow rate; a pressure detector that detects air pressure of the tire air chamber to output a signal corresponding to the air pressure; air leakage alarming means for giving an alarm when air leakage is equal to or greater than a predetermined amount corresponding to a tire blowout based on the airflow rate detection signal of the airflow rate detection means; and a controller that opens the stop valve until a signal indicating returning of the air pressure to a normal value is outputted from the pressure detector when a signal indicating decrease in the air pressure is outputted from the pressure detector, and stops giving the alarm for a predetermined time in the early stage of the start of operation (at engine start of an automobile).

In the tire air pressure controller described in the Patent Document 1, when decrease in the air pressure of the tire air chamber is due to a large amount of air leakage such as a tire blowout, the airflow rate supplied from the air pressure source to the tire air chamber of the wheel assembly is equal to or greater than the predetermined value. The air leakage alarming means gives the alarm based on the airflow rate detection signal of the airflow rate detection means. When decrease in the air pressure of the tire air chamber is due to leaving for a long time in the state of a small amount of air leakage, upon start of the tire air pressure controller, the airflow rate is increased to give the alarm. As in the case of engine start of the automobile, the tire air pressure controller stops giving the alarm within the predetermined time in the early stage of the start of operation of the tire air pressure controller.

In the construction described in the Patent Document 1, except for the early stage of the start of operation of the tire air pressure controller, when the airflow rate supplied from the air pressure source to the tire air chamber of the wheel assembly is equal to or greater than the predetermined value, the air leakage alarming means gives the alarm based on the airflow rate detection signal of the airflow rate detection means. Regardless of the presence of risk causing large damage to the tire (tire risk), when the damage of the tire is small and the airflow rate supplied from the air pressure source to the tire air chamber of the wheel assembly is smaller than the predetermined value, the air leakage alarming means does not give the alarm so that the occupant cannot be notified of tire risk.

Such problem can be solved by setting the predetermined value to be low. In such setting, when the tire is required to be repaired immediately or the tire is not required to be repaired immediately, the air leakage alarming means gives the alarm at the time the airflow rate supplied from the air pressure source to the tire air chamber of the wheel assembly is equal to or greater than the predetermined value. Even though the tire is not required to be repaired immediately when the air leakage alarming means gives the alarm, the tire can be required to be repaired immediately by the alarm of the air leakage alarming means.

DISCLOSURE OF THE INVENTION

The present invention has been made to cope with the above problems. A tire risk judging device of a wheel assembly for a vehicle according to the present invention has a pressure sensor that detects air pressure of a tire air chamber of the wheel assembly of the vehicle; an air pressure-generating device capable of supplying pressurized air to the tire air chamber; supply airflow rate computation means for computing a supply airflow rate supplied from the air pressure-generating device to the tire air chamber when the vehicle drives from the present location to a specified location on a particular path; leakage airflow rate computation means for computing a leakage airflow rate leaked from the tire air chamber when the vehicle drives from the present location to the specified location on the particular path; tire air pressure computation means for computing air pressure in the specified location of the tire air chamber based on air pressure in the present location of the tire air chamber detected by the pressure sensor, the supply airflow rate computed by the supply airflow rate computation means, and the leakage airflow rate computed by the leakage airflow rate computation means; and specified location tire risk judgment means for judging tire risk in the specified location based on the air pressure in the specified location of the tire air chamber computed by the tire air pressure computation means.

In the tire risk judging device of a wheel assembly for a vehicle according to the present invention, the supply airflow rate computation means computes a supply airflow rate supplied from the air pressure-generating device to the tire air chamber when the vehicle drives from the present location to the specified location on the particular path, and the leakage airflow rate computation means computes a leakage airflow rate leaked from the tire air chamber when the vehicle drives from the present location to the specified location on the particular path. The tire air pressure computation means computes air pressure in the specified location of the tire air chamber based on air pressure in the present location of the tire air chamber detected by the pressure sensor, the supply airflow rate computed by the supply airflow rate computation means, and the leakage airflow rate computed by the leakage airflow rate computation means, and the specified location tire risk judgment means judges tire risk in the specified location based on the air pressure in the specified location of the tire air chamber computed by the tire air pressure computation means.

From the judged result of the specified location tire risk judgment means, tire risk in the specified location can be judged. From the judged result of "there is tire risk in the specified location", it is possible to notify that the tire is required to be repaired immediately before the vehicle reaches the specified location from the present location. From the judged result of "there is no tire risk in the specified location", it is possible to notify that the tire is not required to be repaired until the vehicle reaches the specified location from the present location. Repair of the tire for avoiding tire risk can be performed with good timing.

The present invention can also be embodied such that the tire risk judging device of a wheel assembly for a vehicle can have present location tire risk judgment means judging tire risk in the present location based on the air pressure in the present location of the tire air chamber detected by the pressure sensor. In this case, from the judged result of the specified location tire risk judgment means, tire risk in the specified location can be judged, and from the judged result of the present location tire risk judgment means, tire risk in the present location can also be judged. From the judged results of "there is tire risk in the specified location" and "there is tire risk in the present location", it is possible to notify that the tire is required to be repaired immediately in the present location.

From the judged results of "there is no tire risk in the specified location" and "there is no tire risk in the present location", it is possible to notify that the tire is not required to be repaired. From the judged results of "there is tire risk in the specified location" and "there is no tire risk in the present location", it is possible to notify that the tire is required to be repaired while the vehicle reaches the specified location from the present location. From the judged results of "there is no tire risk in the specified location" and "there is tire risk in the present location", it is possible to notify that the tire is required to be repaired and the tire is not required to be repaired until the vehicle reaches the specified location from the present location.

The present invention can also be embodied such that the tire risk judging device of a wheel assembly for a vehicle can have specified location tire risk notification means capable of notifying an occupant of tire risk in the specified location judged by the specified location tire risk judgment means. The tire risk judging device of a wheel assembly for a vehicle can also have present location tire risk notification means capable of notifying the occupant of tire risk in the present location judged by the present location tire risk judgment means. In these cases, the respective notification means can precisely notify the occupant of the tire risks.

The present invention can also be embodied such that the air pressure-generating device can be driven by rotation of the wheel assembly. In this case, the air pressure-generating device is not driven when the wheel assembly is stopped. A leakage airflow rate from the tire air chamber can be computed at high accuracy based on decrease in the air pressure of the tire air chamber.

The present invention can also be embodied such that the tire risk judging device of a wheel assembly for a vehicle can have tire load computation means for computing a load applied on the tire of the wheel assembly when the vehicle drives from the present location to the specified location on the particular path; and tire risk correction means for correcting the tire risk judged by the specified location tire risk judgment means according to the load computed by the tire load computation means. In this case, the tire risk in the specified location can be precisely judged. The load applied on the tire can be computed based on the proportion of a straight road or a curved road on the particular path (the total distance of the straight road or the curved road/the overall distance of the particular path) and the total weight of the vehicle. The proportion of the straight road or the curved road can be computed based on road data obtained from a known on-board navigation device. The total weight of the vehicle can be computed based on an output of a load sensor that detects a payload of the vehicle and the body weight.

The present invention can also be embodied such that the particular path is one path selected from plural predetermined paths. The plural predetermined paths may be searched by a path search function of the known on-board navigation device.

In this case, the tire risk judging device of a wheel assembly for a vehicle can have different path supply airflow rate computation means for computing a supply airflow rate supplied from the air pressure-generating device to the tire air chamber when the vehicle drives from the present location to a specified location on a path different from the particular path; different path leakage airflow rate computation means for computing a leakage airflow rate leaked from the tire air chamber when the vehicle drives from the present location to the specified location on the path different from the particular path; different path tire air pressure computation means for computing air pressure in the specified location of the tire air chamber based on air pressure in the present location of the tire air chamber detected by the pressure sensor, the supply airflow rate computed by the different path supply airflow rate computation means, and the leakage airflow rate computed by the different path leakage airflow rate computation means; and recommended path notification means for selecting a path having the lowest tire risk degree in the specified location based on the air pressures computed by the different path tire air pressure computation means and the tire air pressure computation means and notifies the occupant of the path.

In this case, the recommended path notification means selects the path having the lowest tire risk degree in the specified location from the plural predetermined paths and notifies the occupant of the path. It is possible to drive from the present location to the specified location via the path having the lowest tire risk degree in the specified location.

BEST MODE FOR CARRYING OUT THE INVENTION

Figure 1:
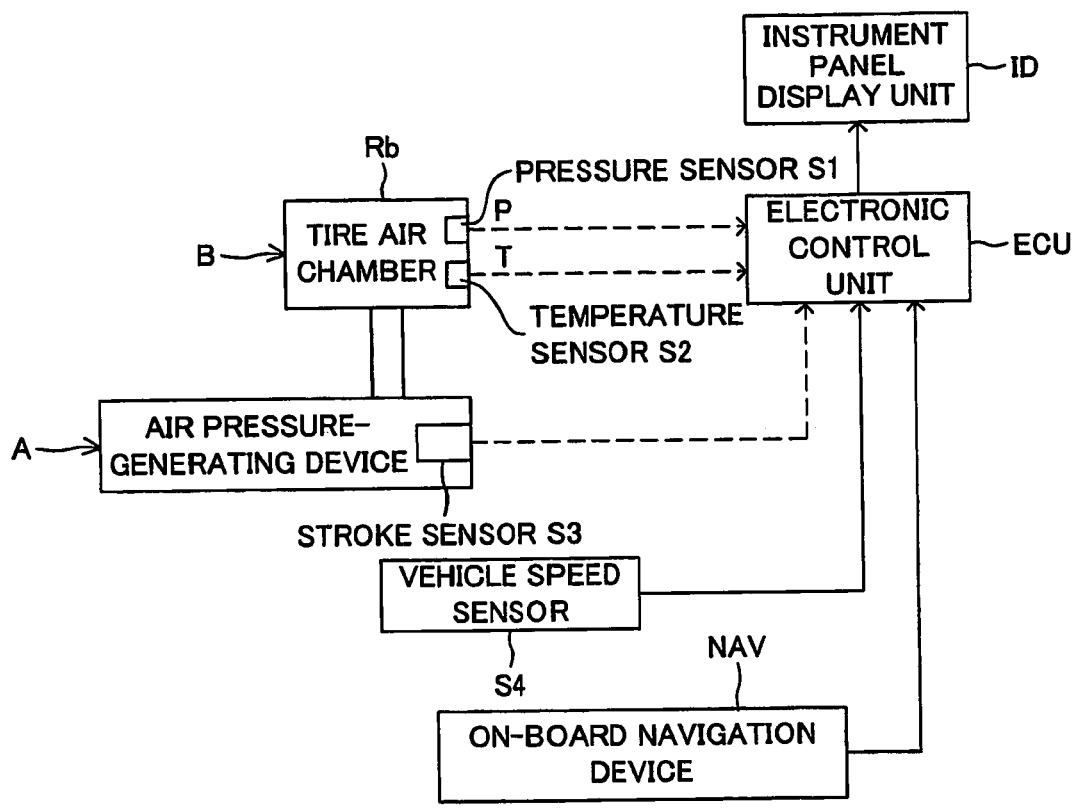
FIG. 1 is an overall block diagram schematically showing an embodiment of a tire risk judging device of a wheel assembly for a vehicle according to the present invention.
Figure 2:
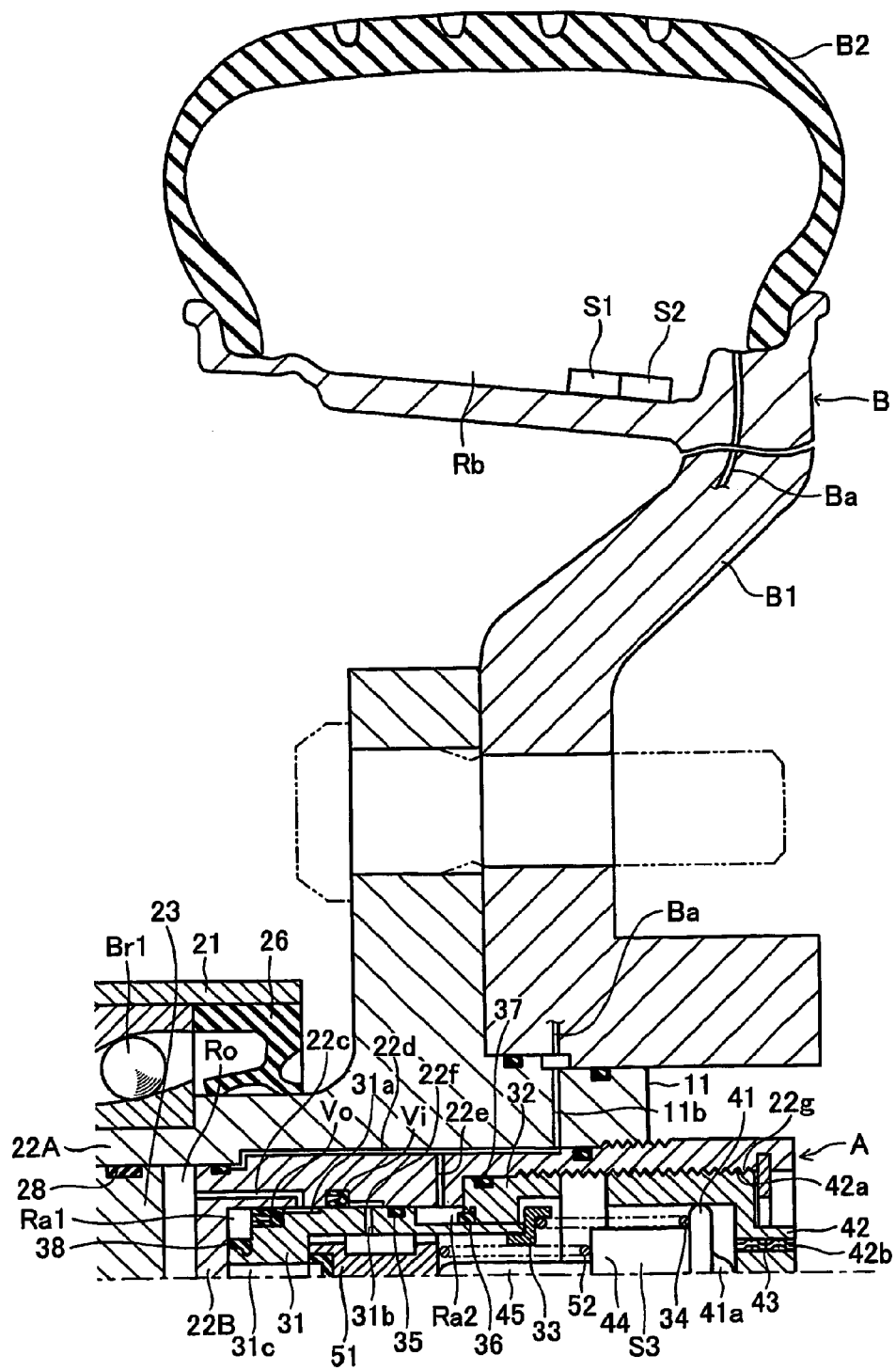
FIG. 2 is a longitudinal front view showing in detail essential portions of a tire air chamber and an air pressure-generating device shown in FIG. 1.

An embodiment according to the present invention will be described below based on the drawings. FIG. 1 schematically shows an embodiment of a tire risk judging device of a wheel assembly for a vehicle according to the present invention. The tire risk judging device has a pressure sensor S1 detecting air pressure (P) of a tire air chamber Rb of a wheel assembly B of a vehicle, a temperature sensor S2 detecting an air temperature (T) of the tire air chamber Rb, and an air pressure-generating device A capable of supplying pressurized air to the tire air chamber Rb of the wheel assembly B. As shown in FIG. 2, the tire air chamber Rb is formed by a wheel B1 and a tire B2 of the wheel assembly B and has in its inside the pressure sensor S1 detecting the air pressure (P) of the tire air chamber Rb and the temperature sensor S2 detecting the air temperature (T) of the tire air chamber Rb.

Figure 3:
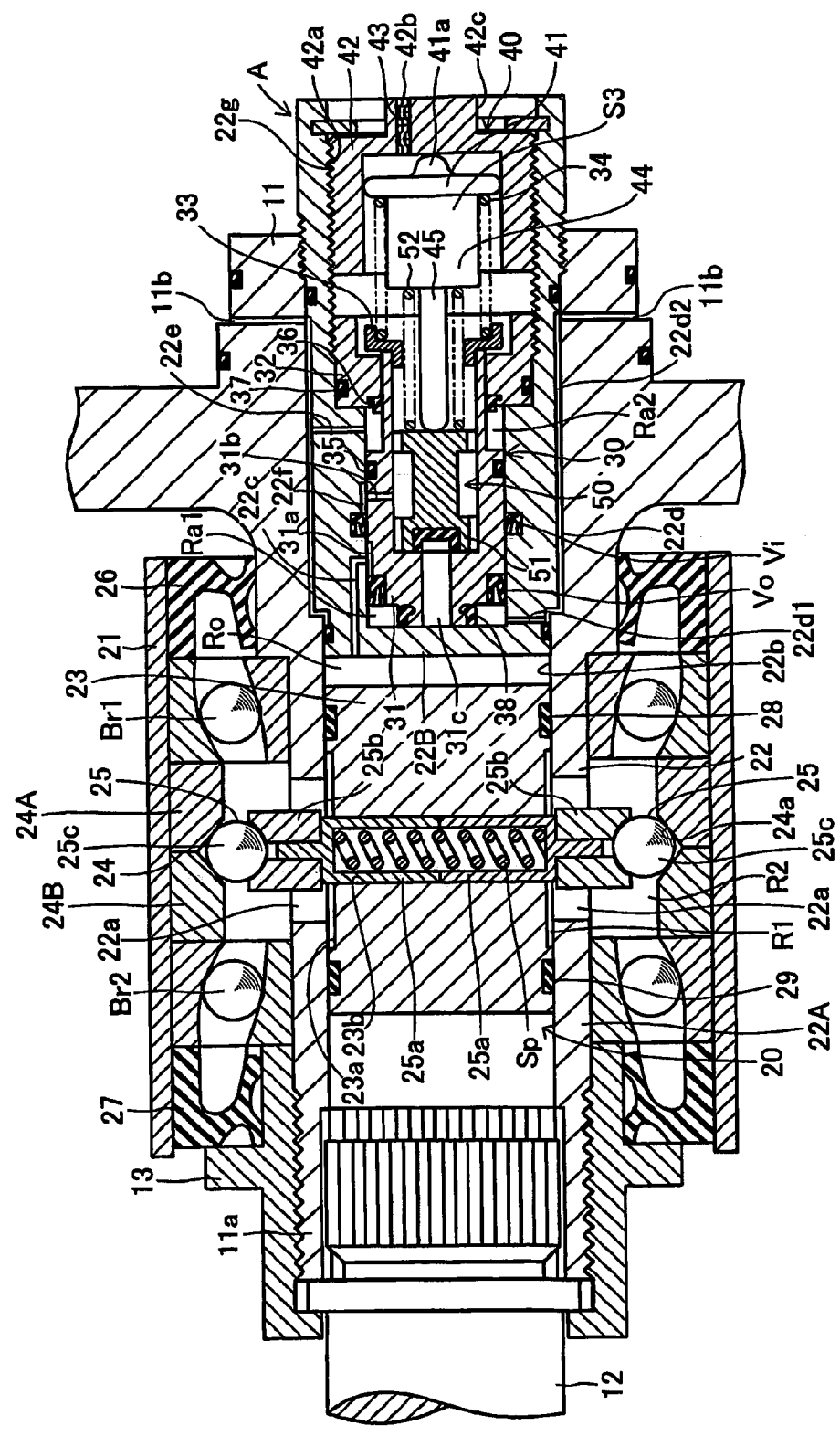
FIG. 3 is a cross-sectional view of the air pressure-generating device shown in FIGS. 1 and 2.

As shown in FIGS. 2 and 3 in detail, the air pressure-generating device A is attached to an axle hub 11 rotated with the wheel assembly B. A driving axle 12 is spline fitted to the vehicle inner side end portion of the axle hub 11 and is coupled thereto so as to transmit torque. Coupling of the axle hub 11 and the driving axle 12 is fixed by means of a locking nut 13.

The air pressure-generating device A has an air pump 20, a pressure control valve 30, and an adjusting device 40 disposed coaxially with an axial portion (rotation axis) 11a of the axle hub 11 and a relief valve 50 disposed coaxially in the pressure control valve 30. The air pump 20 is disposed on the vehicle innermost side of the air pump 20, the pressure control valve 30, and the adjusting device 40. The pressure control valve 30 is disposed between the air pump 20 and the adjusting device 40. The adjusting device 40 is disposed on the vehicle outermost side of the air pump 20, the pressure control valve 30, and the adjusting device 40.

The air pump 20 is driven with rotation of the wheel assembly B and stops driving with rotating stop of the wheel assembly B. The air pump 20 can supply pressurized air to the tire air chamber Rb of the wheel assembly B via the pressure control valve 30 based on rotation of the wheel assembly B. The air pump 20 has a nonrotatable cylindrical member 21, a rotatable cylinder 22 formed in the axial portion 11a of the axle hub 11, a piston 23 as a reciprocating motion body, a cam member 24, and a pair of cam followers 25.

The cylindrical member 21 is nonrotatably supported by a support member (not shown). The cylinder 22 is supported in the interior of the cylindrical member 21 rotatably about the rotation center of the wheel assembly B and liquid-tightly via a pair of bearings Br1 and Br2 and a pair of annular seal members 26 and 27. The paired bearings Br1 and Br2 are spaced a predetermined distance apart from each other in the axial direction and intervene between the cylindrical member 21 and the cylinder 22 while sandwiching the cam member 24 therebetween in the axial direction, thereby enabling rotation of the cylinder 22 in relation to the cylindrical member 21. The paired annular seal members 26 and 27 are spaced a predetermined distance apart from each other in the axial direction and intervene between the cylindrical member 21 and the cylinder 22 while sandwiching the cam member 24 and the bearings Br1 and Br2 therebetween in the axial direction, thereby providing a liquid-tight seal between the cylindrical member 21 and the cylinder 22.

The cylinder 22 includes a cylinder body 22A and a cylinder head 22B, which is hermetically and detachably screw-engaged with the vehicle outer side end portion of the cylinder body 22A. The cylinder body 22A is formed unitarily with the axial portion 11a of the axle hub 11 and has a pair of axially elongated holes 22a and a cylinder bore 22b extending in the cylinder axial direction. The cylinder head 22B is a closed-bottomed tubular cap member attached to the axle hub 11 hermetically and detachably, and has a suction/discharge passage 22c, a discharge passage 22d, an introduced pressure passage 22e, and a suction passage 22f.

The paired axially elongated holes 22a collectively serve as a guide means for guiding the piston 23 and the cam followers 25 in such a manner that these members are rotatable unitarily with the cylinder 22 and can reciprocate in the piston axial direction. The paired axially elongated holes 22a are spaced 180 degrees apart from each other in the circumferential direction of the cylinder 22. The cylinder bore 22b accommodates the piston 23, closes the vehicle outer side end portion by the cylinder head 22B, and forms a pump chamber Ro by the cylinder head 22B and the piston 23.

The suction/discharge passage 22c constantly communicates with a communication passage 31a provided in a valve body 31 of the pressure control valve 30. The suction/discharge passage 22c can lead air into the pump chamber Ro via a suction check valve Vi (whose section is constructed of a V-shaped annular seal member) attached to the cylinder head 22B. The suction/discharge passage 22c can lead air out from the pump chamber Ro via a discharge check valve Vo (whose section is constructed of a V-shaped annular seal member) attached to the valve body 31 of the pressure control valve 30.

The discharge passage 22d is a passage guiding pressurized air discharged to an air chamber Ra1 via the discharge check valve Vo to the discharge passage 11b provided in the axle hub 11 and has a communication hole 22d1 in the diameter direction provided in the cylinder head 22B and a communication groove 22d2 provided on the outer circumference of the cylinder head 22B. As shown in FIG. 2, the discharge passage 11b provided in the axle hub 11 communicates with the tire air chamber Rb via the communication passage Ba provided in the wheel B1.

The introduced pressure passage 22e is a communication hole in the cylinder diameter direction provided in the cylinder head 22B and can introduce the pressure of pressurized air in the discharge passage 22d into an air chamber Ra2 formed between the valve body 31 and a stopper 32 of the pressure control valve 30. The suction passage 22f constantly communicates with an atmosphere communication passage 31b provided in the valve body 31 of the pressure control valve 30 and can communicate with and be blocked from the communication passage 31a provided in the valve body 31 of the pressure control valve 30. The atmosphere communication passage 31b provided in the valve body 31 constantly communicates with the atmosphere via an atmosphere communication passage 42b formed in an adjustment screw 42 of the adjusting device 40.

The piston 23 is inserted into the cylinder bore 22b of the cylinder 22 via a pair of annular seal members 28 and 29 and is attached to the cylinder 22 in a unitarily rotatable manner and in such a manner as to be able to reciprocate in the piston axial direction. The piston 23 is formed with an annular groove 23a and a through hole 23b extending in the piston diameter direction. The paired annular seal members 28 and 29 are spaced a predetermined distance apart from each other in the axial direction and intervene between the piston 23 and the cylinder 22 at respective, axial end portions of the piston 23, thereby providing an air-tight, liquid-tight seal between the piston 23 and the cylinder 22.

The annular groove 23a is formed on the outer circumference of the piston 23 between the paired annular seal members 28 and 29, whereby an annular space R1 is formed between the piston 23 and the cylinder 22. The annular space R1 communicates with an annular space R2 formed between the paired annular seal members 26 and 27, through the axially elongated holes 22a of the cylinder 22. The annular spaces R1 and R2 remain unchanged in volume during axial reciprocating motion of the piston 23 and are sealed by means of the four seal members 26, 27, 28, and 29. The annular spaces R1 and R2 and the like collectively serve as an oil chamber for accommodating a predetermined amount of lubrication oil. The oil chamber accommodates the bearings Br1 and Br2, the cam member 24, the cam followers 25, a compression coil spring Sp, and the like.

The cam member 24 consists of a pair of cam sleeves 24A and 24B, which are provided in contact with each other in the piston axial direction and is attached unitarily (in an axially immovable manner and in a nonrotatable manner) with the cylindrical member 21. The cam member 24 is disposed coaxially with the cylinder 22. The cam member 24 has an annular cam portion 24a whose axial position varies. The cam portion 24a is a cam groove, with which balls 25c of the cam followers 25 are engaged. The cam portion 24a has a cam face which is subjected to a load in the piston axial direction (a vertical load in the figure) and a piston diameter load (a horizontal load in the figure) from the balls 25c of the cam followers 25. This cam face has a V-shaped cross section and has an even number of geometric cycles (e.g., two geometric cycles) along the circumferential direction of the cylinder 22.

The cam followers 25 have shafts 25a divided into two pieces within the piston 23, and rollers 25b and the balls 25c attached to the shafts 25a. The shafts 25a of the cam followers 25 are provided in the through hole 23b of the piston 23 to be movable in the diameter direction of the piston 23. The balls 25c of the cam followers 25 are engaged with the cam portion (cam groove) 24a of the cam member 24 at the end portions extended in the piston diameter direction. Through relative rotation in relation to the cam member 24, the cam followers 25 can move in the axial direction.

The shafts 25a serve as load transmission elements, which are installed in the through hole 23b of the piston 23 in such a manner as to be movable in the diameter direction of the piston 23 (the axial direction of the through hole 23b). The compression coil spring Sp installed within the shafts 25a applies force to the shafts 25a in the diameter outward direction of the piston 23. The shafts 25a are support bodies rotatably supporting the rollers 25b and rotatably supporting the rollers 25b at respective small-diameter end portions protruded from the through hole 23b of the piston 23.

While being rotatably fitted to the respective small-diameter end portions of the shafts 25a, the rollers 25b are rollably fitted into the respective axially elongated holes 22a of the cylinder 22. The rollers 25b can roll along the respective axially elongated holes 22a of the cylinder 22 in association with the cylinder axial movement of the cam followers 25. Each of the rollers 25b has a hemispherically recessed bearing portion at its outer end. The bearing portions rollably support the respective balls 25c.

The balls 25c are convex portions of the cam followers 25 rollably supported by the rollers 25b and engaged rollably with the cam portion (cam groove) 24a of the cam member 24. The balls 25c are engaged resiliently with the cam portion (cam groove) 24a of the cam member 24 without space upon reception of the resilient force of the compression coil spring Sp via the shafts 25a and the rollers 25b.

The compression coil spring Sp is a pressing means for pressing the balls 25c of the cam followers 25 in the diameter direction of the piston 23 toward the cam portion (cam groove) 24a of the cam member 24. The compression coil spring Sp is installed in closed-bottomed mounting holes of the shafts 25a of the cam followers 25 under predetermined preload.

In the air pump 20, when the cylinder 22 (the axle hub 11) rotates in the state that the valve body 31 of the pressure control valve 30 is held in the shown position, the piston 23 and the cam followers 25 rotate unitarily with the cylinder 22 and make relative rotation in relation to the cam member 24 to thereby move axially. Accordingly, the rotary movement of the cylinder 22 can be converted to the reciprocating motion of the piston 23. The reciprocating motion of the piston 23 can increase and decrease the volume of the pump chamber Ro.

Thus, air can be introduced into the pump chamber Ro through the suction check valve Vi, the communication passage 31a, and the suction/discharge passage 22c. Air can be discharged from the pump chamber Ro through the suction/discharge passage 22c, the communication passage 31a, and the discharge check valve Vo.

The pressure control valve 30 is installed in the cylinder head 22B, and has the valve body 31, the stopper 32, and a compression coil spring 34 which is engaged with the valve body 31 via a spring retainer 33, can control the moving timing and the moving position of the valve body 31, and can adjust the exertion force to the valve body 31 by the adjusting device 40. The pressure control valve 30 is switched from the operation state (in the state that the valve body 31 is moved a predetermined distance from the shown position against the exertion force of the compression coil springs 34 and 52) to the shown state when the air pressure (P) of the tire air chamber Rb is lowered to a lower limit set value P1, thereby supplying pressurized air from the pump chamber Ro to the tire air chamber Rb. The pressure control valve 30 is switched from the shown state to the operation state when the pressure of pressurized air supplied from the pump chamber Ro to the tire air chamber Rb is increased to an upper limit set value P2 (P1<P2) to limit (stop) supply of the pressurized air from the pump chamber Ro to the tire air chamber Rb.

The valve body 31 is installed in the cylinder head 22B in air-tight manner and in such a manner to be movable in the cylinder axial direction via the discharge check valve Vo and an annular seal member 35 installed on its outer periphery. The valve body 31 forms the air chamber Ra1 communicating with the discharge passage 22d between the valve body 31 and the cylinder head 22B. The valve body 31 forms the air chamber Ra2 communicating with the discharge passage 22d via the introduced pressure passage 22e between the valve body 31 and the stopper 32. The stopper 32 is installed on its inner periphery with an annular seal member 36 and is installed on its outer periphery with the annular seal member 37. The stopper 32 is interposed between the cylinder head 22B and the valve body 31 in air-tight manner. The stopper 32 is screw-engaged unitarily with the cylinder head 22B at the vehicle outer side end portion on its outer periphery.

In the pressure control valve 30, when the air pressure (P) of the tire air chamber Rb is lowered to the lower limit set value P1 to be increased to the upper limit set value P2, the valve body 31 is held in the shown position. The communication between the communication passage 31a and the suction passage 22f is blocked by the suction check valve Vi. The suction check valve Vi allows the air flow from the atmosphere into the tire air chamber Ro. The discharge check valve Vo allows the air flow from the pump chamber Ro to the tire air chamber Rb (the shown state). In this state, the suction check valve Vi blocks the communication between the communication passage 31a and the suction passage 22f to regulate the air flow from the pump chamber Ro into the atmosphere. The discharge check valve Vo regulates the air flow from the tire air chamber Rb into the pump chamber Ro. In this state (the ON state of the pressure control valve 30), the reciprocating motion of the piston 23 with rotation of the wheel assembly B introduces the atmosphere into the pump chamber Ro and discharges the pressurized air from the pump chamber Ro to the tire air chamber Rb.

In the pressure control valve 30, when the air pressure (P) of the tire air chamber Rb is increased to the upper limit set value P2 to be lowered to the lower limit set value P1, the valve body 31 is axially moved a predetermined distance from the shown position against the exertion force of the compression coil springs 34 and 52, and the communication passage 31a communicates with the suction passage 22f regardless of the suction check valve Vi. The suction check valve Vi loses its function (reverse flow inhibition function). The communication passage 31a communicates with the suction passage 22f to allow the air flow between the pump chamber Ro and the atmosphere. The discharge check valve Vo regulates the air flow between the discharge passage 22d and the communication passage 31a, that is, the pump chamber Ro and the tire air chamber Rb. In the state that the valve body 31 is moved a predetermined distance from the shown position against the exertion force of the compression coil springs 34 and 52 (operation state), the step portion of the valve body 31 is contacted with the annular seal member 36 installed on the inner circumference of the stopper 32. In this state (the OFF state of the pressure control valve 30), even when the piston 23 is reciprocated with rotation of the wheel assembly B, air introduced into the pump chamber Ro is pressed back to the atmosphere and is not discharged from the pump chamber Ro to the tire air chamber Rb.

The adjusting device 40 has a spring support 41 supporting the other end portion of the compression coil spring 34 of the pressure control valve 30 (the fixed side end portion immovable upon movement of the valve body 31) and the adjustment screw 42 which can adjust the position of the spring support 41. The spring support 41 detects the ON and OFF state of the pressure control valve 30 and is a moving portion upon adjustment of a stroke sensor S3 for detecting the movement amount of the adjustment screw 42. The spring support 41 is rotatably engaged in a hemispherical convex portion 41a with the adjustment screw 42.

The adjustment screw 42 is separate from the spring support 41 and has a male screw portion 42a and an atmosphere communication passage 42b. The adjustment screw 42 is screw-engaged in the male screw portion 42a with a female screw portion 22g of the cylinder head 22B to be moved forward and backward. The adjustment screw 42 serves as a cap and can be rotated from the outside of the vehicle. The adjustment screw 42 is formed at the outer side end portion with a hexagonal head portion 42c for detachably mounting the manually operable adjusting tool (not shown). The atmosphere communication passage 42b is fitted with a filter 43.

The relief valve 50 releases pressurized air into the atmosphere when the pressure of pressurized air supplied from the pump chamber Ro to the tire air chamber Rb, that is, the air pressure (P) in the air chamber Ra1, is equal to or above a relief set value P3 higher than the upper limit set value P2. The relief valve 50 has a valve body 51 which can open and block a relief passage 31c provided in the valve body 31 and the compression coil spring 52 engaged at one end portion (moving side end portion) with the valve body 51 and defining the moving timing of the valve body 51 (the opening timing of the relief passage 31c).

The valve body 51 is movably installed in the valve body 31 of the pressure control valve 30 in the cylinder axial direction and is contacted with a rod portion 45 of the stroke sensor S3 (the rod portion relatively movable in the cylinder axial direction with little resistance to the movable portion upon adjustment of the stroke sensor S3). The compression coil spring 52 is engaged with a spring support 44 integral with the spring support 41 at the other end portion (fixed side end portion) and can adjust the exertion force acting on the valve body 51 by the adjusting device 40. Upon adjustment by the adjusting device 40, the exertion force of the compression coil spring 34 acting on the valve body 31 of the compression control valve 30 is adjusted at the same time. The upper limit set value P2 and the relief set value P3 can be adjusted at the same time.

In the relief valve 50, the relief passage 31c provided in the valve body 31 of the pressure control valve 30 can communicate with and be blocked from the air chamber Ra1 by an annular seal member 38 attached to the valve body 31. The valve body 31 of the pressure control valve 30 is moved in the cylinder axial direction against the exertion force of the compression coil springs 34 and 52. The air chamber Ra1 and the relief passage 31c communicate with each other via the seal member 38. Only in this state, the pressure in the air chamber Ra1 is given to the relief passage 31c to operate the relief valve 50.

In this embodiment, as shown in FIG. 1, an output of the pressure sensor S1 (an electric signal indicating the air pressure (P) of the tire air chamber Rb), an output of the temperature sensor S2 (an electric signal indicating the air temperature (T) of the tire air chamber Rb), and outputs of the stroke sensor S3 (an electric signal indicating the ON and OFF state of the pressure control valve 30 and an electric signal indicating the movement amount of the adjustment screw 42) are wirelessly inputted to an electronic control unit ECU. An electric signal indicating a vehicle speed detected and outputted by a vehicle speed sensor S4 (or a wheel speed (Wr)) and electric signals indicating distances (Y1 to Y6) from the present location to a specified location, predetermined times (Z1 to Z6) from the present location to the specified location, straight road proportions ($\alpha 1$ to $\alpha 6$) from the present location to the specified location, and the specified location, which are outputted from an on-board navigation device NAV, are inputted to the electronic control unit ECU.

The electronic control unit ECU is electrically connected to an instrument panel display unit ID which can display the leakage judged result ("leakage is abnormal" or "leakage is normal") of the air pressure system including the tire air chamber Rb (the system having the tire air pressure chamber Rb and an air passage communicating therewith), the judged result of the air pressure-generating device A ("air pressure generation is abnormal" or "air pressure generation is normal"), the tire risk judged result in the present location ("there is tire risk in the present location" or "there is no tire risk in the present location"), the tire risk judged result in the specified location ("there is tire risk in the specified location" or "there is no tire risk in the specified location"), and "recommended path Xx".

Figure 4:
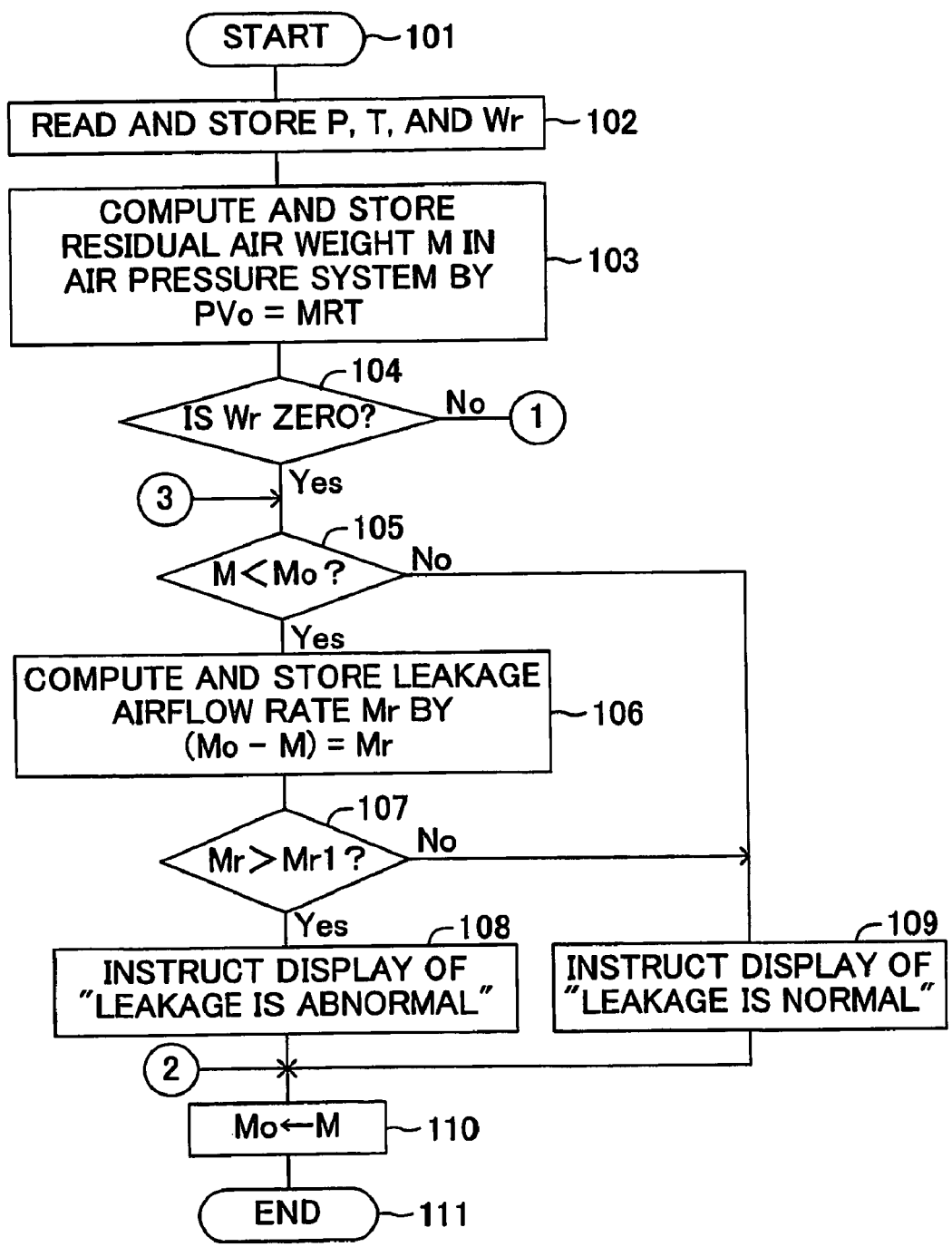
FIG. 4 is a flowchart showing a part of a program repeatedly executed by a microcomputer of an electronic control unit shown in FIG. 1 in each predetermined computation cycle.
Figure 5:
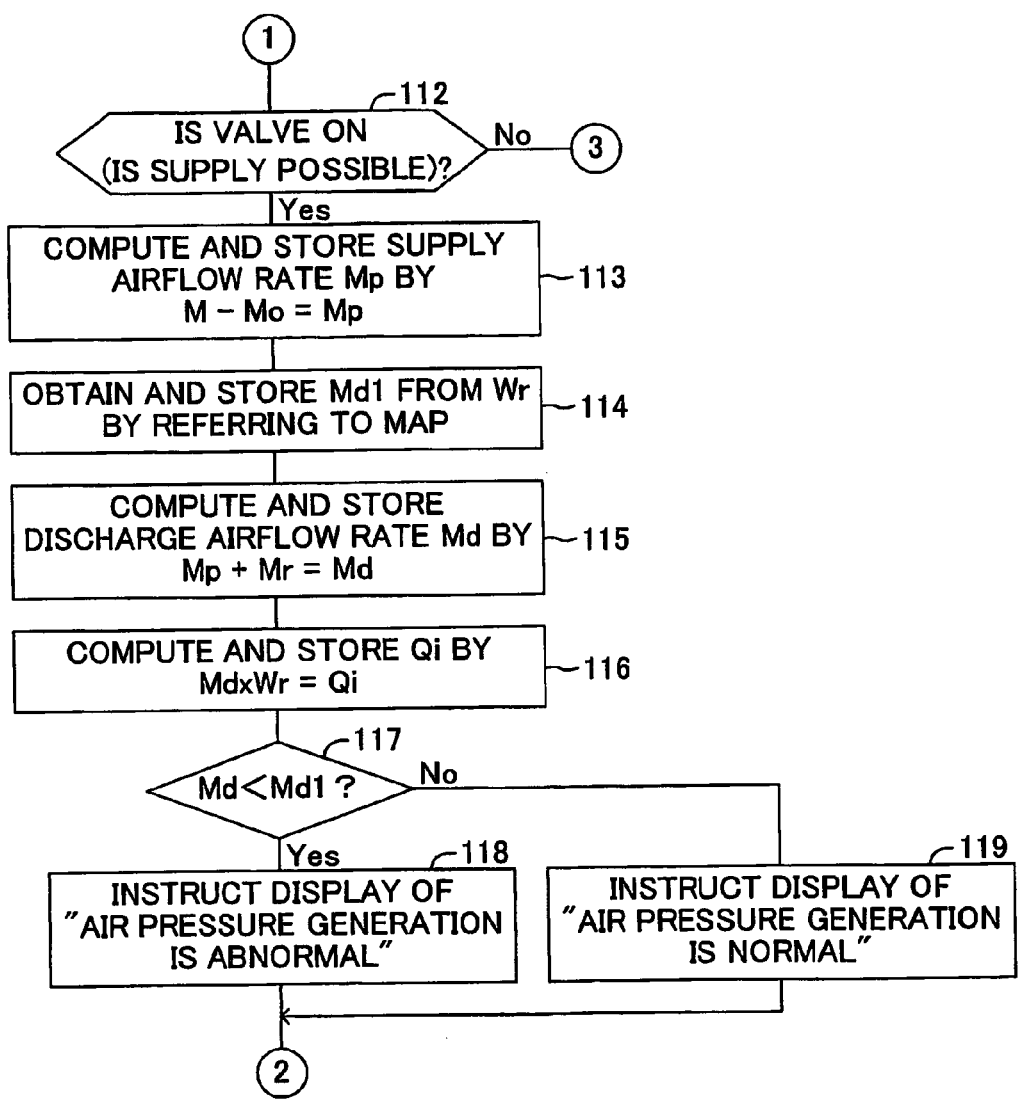
FIG. 5 is a flowchart showing another part of the program repeatedly executed by the microcomputer of the electronic control unit shown in FIG. 1 in each predetermined computation cycle.
Figure 6:
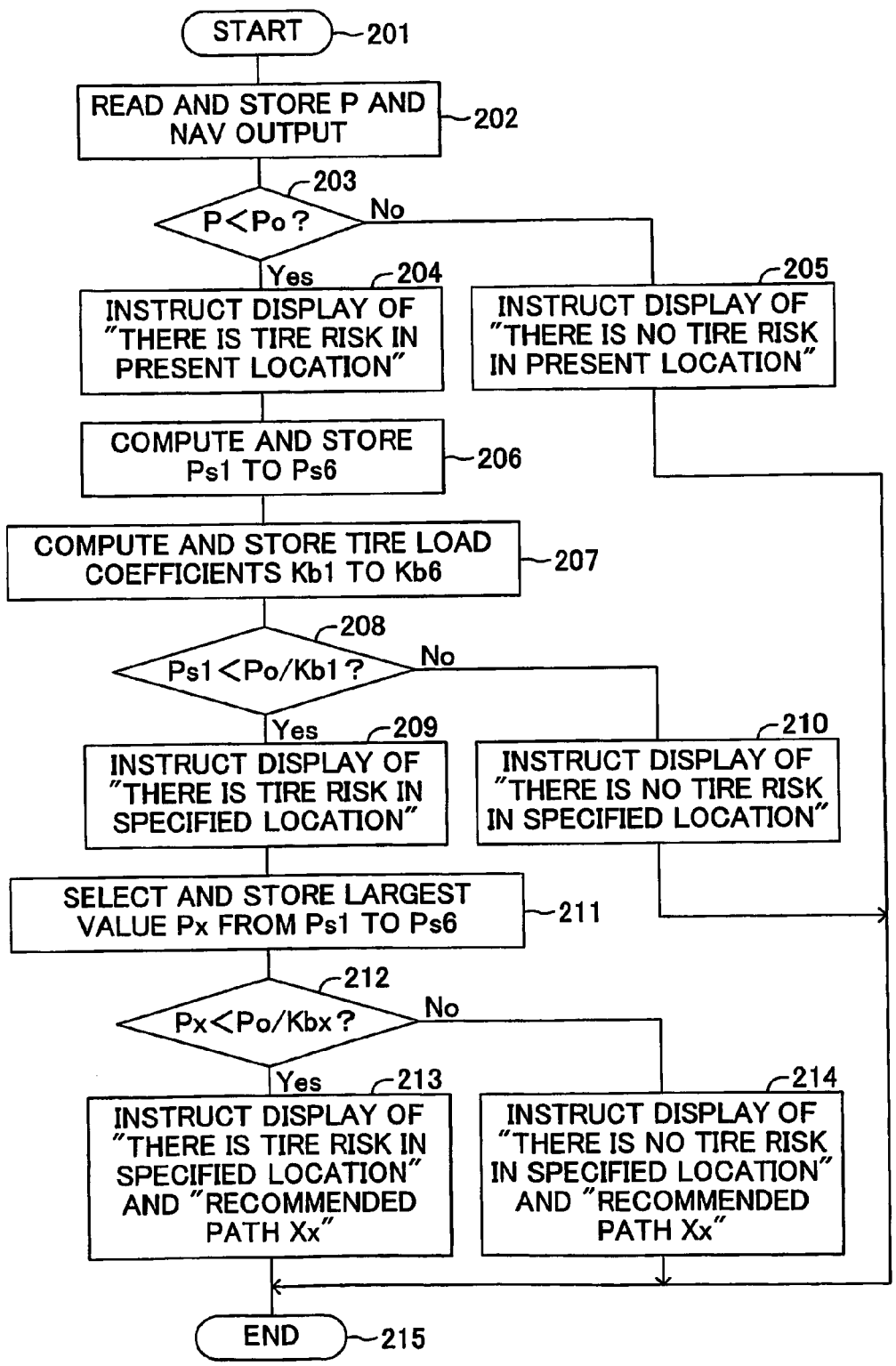
FIG. 6 is a flowchart showing a part of a program executed by the microcomputer of the electronic control unit shown in FIG. 1 in each time a driver specifies a specified location.

The electronic control unit ECU has a microcomputer repeatedly executing a program corresponding to the flowcharts of FIGS. 4 and 5 in each predetermined computation cycle (e.g., 1 sec) and executing a program corresponding to the flowchart of FIG. 6 in each time a driver (occupant) specifies the specified location. The electronic control unit ECU can compute a residual air weight M (Mo) in the air pressure system including the tire air chamber Rb, a leakage airflow rate Mr from the air pressure system including the tire air chamber Rb, and a discharge airflow rate Md discharged from the tire air pressure-generating device A to the tire air chamber Rb upon driving of the tire air pressure-generating device A based on outputs of the pressure sensor S1, the temperature sensor S2, the stroke sensor S3, and the vehicle speed sensor S4. The electronic control unit ECU can also compute the tire risk judged result in the present location and the tire risk judged result in the specified location based on the residual air weight M (Mo), the leakage airflow rate Mr, the discharge airflow rate Md, and the outputs of the on-board navigation device NAV.

The on-board navigation device NAV has known functions except for a specified location path search function searching a path to the point specified by the driver (the specified location) as a destination, specifically, a path X1 corresponding to requests of the driver (for instance, preference of highway, preference of ordinary road, and the like) and plural (e.g., five) paths X2 to X6, a function of computing the overall distances Y1 to Y6 of the paths X1 to X6 searched by the specified location path search function (distances from the present location to the specified location) to output them to the electronic control unit ECU, a function of computing the predetermined times Z1 to Z6 of the paths X1 to X6 (times required from the present location to the specified location) to output them to the electronic control unit ECU, a function of computing the straight road proportions ($\alpha 1$ to $\alpha 6$) from the present location to the specified location of the paths X1 to X6 to output them to the electronic control unit ECU, and a function of outputting the point specified by the driver (the specified location) to the electronic control unit ECU.

In this embodiment constructed as described above, when the ignition switch (not shown) of the vehicle is ON, the on-board navigation device NAV can be used. The microcomputer of the electronic control unit ECU repeatedly executes the program corresponding to the flowcharts of FIGS. 4 and 5 in each predetermined computation cycle (1 sec). When the pressure control valve 30 is OFF (pressurized air cannot be supplied to the tire air chamber Rb) while the vehicle is stopped and the vehicle is driving, the leakage airflow rate Mr (g/sec) from the air pressure system including the tire air chamber Rb is computed and leakage of the air pressure system including the tire air chamber Rb is judged based on the leakage airflow rate Mr. When the pressure control valve 30 is ON (pressurized air can be supplied to the tire air chamber Rb) while the vehicle is driving, the discharge airflow rate Md (g/sec) discharged from the air pressure-generating device A to the tire air chamber Rb is computed and a discharge air volume Qi (g/m) per unit distance is computed based on the discharge airflow rate Md and the vehicle speed (wheel speed) Wr (m/sec) at this point, thereby judging whether the air pressure-generating device A is normal or abnormal.

The microcomputer of the electronic control unit ECU starts processing in step 101 of FIG. 4 and reads and stores the output (P) of the pressure sensor S1, the output (T) of the temperature sensor S2, and the output (Wr) of the vehicle speed sensor S4 in step 102. The microcomputer of the electronic control unit ECU computes and stores the residual air weight M of the air pressure system including the tire air chamber Rb based on a gas state equation $P \cdot Vo = M \cdot R \cdot T$ and the output values (P, T) in step 103. In the gas state equation, P is an "absolute pressure", T is an "absolute temperature", and M is an "air weight". Vo is "the volume of the air pressure system including the tire air chamber Rb", and R is "a gas constant of air". Vo and R are determined by an experiment or analysis and stored as unchanged values (constant values).

In step 104 of FIG. 4, the microcomputer of the electronic control unit ECU judges whether or not the output (Wr) of the vehicle speed sensor S4 is zero (whether or not the air pressure-generating device A is stopped and pressurized air cannot be supplied to the tire air chamber Rb). If "Yes" (the pressurized air cannot be supplied to the tire air chamber Rb), the microcomputer of the electronic control unit ECU executes step 105. If "No", it executes step 112 of FIG. 5.

In step 105 of FIG. 4, the microcomputer of the electronic control unit ECU compares the residual air weight M obtained in step 103 (this computed value) with the residual air weight Mo (the previous computed value, that is, the computed value when the program is executed 1 sec before). When this residual air weight M is smaller than the previous residual air weight Mo (when air is leaked from the air pressure system including the tire air chamber Rb), the microcomputer of the electronic control unit ECU judges this to be "Yes" to execute steps 106 and 107. When this residual air weight M is not smaller than the previous residual air weight Mo, it judges this to be "No" to execute steps 109, 110, and 111.

In step 106 of FIG. 4, the microcomputer of the electronic control unit ECU computes and stores the leakage airflow rate Mr by a difference (Mo−M) between the previous residual air weight Mo and this residual air weight M. In step 107, the microcomputer of the electronic control unit ECU judges whether or not the leakage airflow rate Mr is larger than a predetermined leakage allowable upper limit value Mr1. If "Yes", the microcomputer of the electronic control unit ECU executes steps 108, 110, and 111. If "No", it executes steps 109, 110, and 111.

In step 108 of FIG. 4, the microcomputer of the electronic control unit ECU instructs display of "leakage is abnormal". The instrument panel display unit ID displays "leakage is abnormal". In step 109, the microcomputer of the electronic control unit ECU instructs display of "leakage is normal". The instrument panel display unit ID displays "leakage is normal". In step 110, the microcomputer of the electronic control unit ECU rewrites this residual air weight M as the previous residual air weight Mo and stores it. In step 111, the microcomputer of the electronic control unit ECU ends execution of the program.

In step 112 of FIG. 5, the microcomputer of the electronic control unit ECU judges based on the output of the stroke sensor S3 (the electric signal indicating the ON and OFF state of the pressure control valve 30) whether or not the pressure control valve 30 is ON (whether or not the pressure control valve 30 can supply pressurized air to the tire air chamber Rb). If "Yes", the microcomputer of the electronic control unit ECU executes steps 113, 114, 115, 116, and 117 of FIG. 5. If "No", it returns to step 105 of FIG. 4 to execute step 105.

In step 113 of FIG. 5, the microcomputer of the electronic control unit ECU computes and stores the supply airflow rate Mp supplied from the tire air pressure-generating device A to the air pressure system including the tire air chamber Rb based on a difference (M−Mo) between this residual air weight M and the previous residual air weight Mo. In step 114, the microcomputer of the electronic control unit ECU refers to the map from the output (Wr) of the vehicle speed sensor S4 (the map, not shown, showing the relation between a discharge allowable lower limit value Md1 of the air pressure-generating device A and the vehicle speed) to obtain and store the discharge allowable lower limit value Md1 of the air pressure-generating device A.

In step 115 of FIG. 5, the microcomputer of the electronic control unit ECU computes and stores the discharge airflow rate Md discharged from the air pressure-generating device A to the tire air chamber Rb upon driving of the air pressure-generating device A from the supply airflow rate Mp obtained in step 113 and the leakage airflow rate Mr obtained in step 106 of FIG. 4. In step 116, the microcomputer of the electronic control unit ECU computes and stores the discharge air volume Qi (g/m) per unit distance from the discharge airflow rate Md obtained in step 115 and the vehicle speed (Wr).

In step 117 of FIG. 5, the microcomputer of the electronic control unit ECU judges whether or not the discharge airflow rate Md obtained in step 115 is smaller than the discharge allowable lower limit value Md1 obtained in step 114. If "Yes", the microcomputer of the electronic control unit ECU executes step 118, and then, steps 110 and 111 of FIG. 4. If "No", it executes step 119, and then, steps 110 and 111 of FIG. 4.

In step 118 of FIG. 5, the microcomputer of the electronic control unit ECU instructs display of "air pressure generation is abnormal". The instrument panel display unit ID displays "air pressure generation is abnormal". In step 119, the microcomputer of the electronic control unit ECU instructs display of "air pressure generation is normal". The instrument panel display unit ID displays "air pressure generation is normal".

In this embodiment, when the ignition switch (not shown) of the vehicle is ON, the on-board navigation device NAV can be used. The driver uses the on-board navigation device NAV to input the specified location with the requests (for instance, preference of highway, preference of ordinary road, and the like). The on-board navigation device NAV performs known operations including an operation searching the paths X1 to X6 from the present location to the specified location and outputs to the electronic control unit ECU the overall distances Y1 to Y6 of the paths X1 to X6, the predetermined times Z1 to Z6 of the paths X1 to X6, the straight road proportions α1 to α6 from the present location to the specified location on the paths X1 to X6, and the point specified by the driver (the specified location). The microcomputer of the electronic control unit ECU executes the program corresponding to the flowchart of FIG. 6 and judges tire risk in the present location and tire risk in the specified location. The specified location input of the driver may be time (for instance, the point an hour later), not the name of the location when before the input, the destination is set and the path X1 is specified.

In step 201 of FIG. 6, the microcomputer of the electronic control unit ECU starts processing, and in step 202, reads and stores the output (P) of the pressure sensor S1 and the outputs of the on-board navigation device NAV (the overall distances Y1 to Y6 of the paths X1 to X6, the predetermined times Z1 to Z6 of the paths X1 to X6, the straight road proportions α1 to α6 of the paths X1 to X6, and the specified location). The microcomputer of the electronic control unit ECU judges in step 203 whether or not the air pressure (P) of the tire air chamber Rb in the present location is lower than the tire risk judgment reference value Po (Po<P1). If "Yes", the microcomputer of the electronic control unit ECU executes steps 204, 206, 207, and 208. If "No", it executes steps 205 and 215.

In step 204 of FIG. 6, the microcomputer of the electronic control unit ECU instructs display of "there is tire risk in the present location". The instrument panel display unit ID displays "there is tire risk in the present location". In step 205 of FIG. 6, the microcomputer of the electronic control unit ECU instructs display of "there is no tire risk in the present location". The instrument panel display unit ID displays "there is no tire risk in the present location".

In step 206 of FIG. 6, the microcomputer of the electronic control unit ECU computes and stores air pressures (Ps1 to Ps6) of the tire air chamber Rb in the specified location in driving on the paths X1 to X6. In this case, residual air weights (Ms1 to Ms6) of the air pressure system including the tire air chamber Rb in the specified location are computed and stored by adding air supply amounts obtained by the product of the discharge air volume Qi (g/m) per unit distance obtained in step 116 of FIG. 5 and the overall distances Y1 to Y6 (m) of the paths X1 to X6 obtained in step 202 of FIG. 6 to the residual air weight M or Mo of the air pressure system including the tire air chamber Rb in the present location obtained in step 103 or 110 of FIG. 4 and by subtracting from the added values air leakage amounts obtained by the product of the leakage airflow rate Mr (g/sec) obtained in step 106 of FIG. 4 and the predetermined times Z1 to Z6 (sec) of the paths X1 to X6 obtained in step 202 of FIG. 6 (for instance, in the case of the path X1, Ms1=M+Qi×Y1−Mr×Z1).

The air pressures (Ps1 to Ps6) of the tire air chamber Rb in the specified location in driving on the paths X1 to X6 are computed and stored using the gas state equation based on the computed residual air weights (Ms1 to Ms6) as described above (for instance, in the case of the path X1, Ps1·Vo=Ms1·R·T). Vo, R, and T of the gas state equation are the same values as in step 103 of FIG. 4.

In step 207 of FIG. 6, the microcomputer of the electronic control unit ECU computes and stores tire load coefficients Kb1 to Kb6 in driving on the paths X1 to X6 based on the straight road proportions α1 to α6 of the paths X1 to X6 obtained in step 202 of FIG. 6. The tire load coefficients Kb1 to Kb6 are increased according to the magnitude of the load applied on the tire B2 of the wheel assembly B and is decreased according to increase in the straight road proportion of the path to approach "1".

In step 208 of FIG. 6, the microcomputer of the electronic control unit ECU judges whether or not the air pressure Ps1 of the tire air chamber Rb in the specified location in driving on the path X1 corresponding to the requests of the driver is lower than the tire risk judgment reference value Po/Kb1 corrected in consideration of a tire load. If "Yes", the microcomputer of the electronic control unit ECU executes steps 209, 211, and 212. If "No", it executes steps 210 and 215.

In step 209 of FIG. 6, the microcomputer of the electronic control unit ECU instructs display of "there is tire risk in the specified location". The instrument panel display unit ID displays "there is tire risk in the specified location". In step 210 of FIG. 6, the microcomputer of the electronic control unit ECU instructs display of "there is no tire risk in the specified location". The instrument panel display unit ID displays "there is no tire risk in the specified location". In step 211 of FIG. 6, the microcomputer of the electronic control unit ECU selects the largest value Px from the air pressures Ps1 to Ps6 obtained in step 206 to store it with the path (recommended path Xx).

In step 212 of FIG. 6, the microcomputer of the electronic control unit ECU judges whether or not the largest value Px (one of Ps1 to Ps6) of the air pressure selected in step 211 is lower than the tire risk judgment reference value Po/Kbx (one of Kb1 to Kb6 and corresponding to Px) corrected in consideration of a tire load. If "Yes", the microcomputer of the electronic control unit ECU executes steps 213 and 215. If "No", it executes steps 214 and 215.

In step 213 of FIG. 6, the microcomputer of the electronic control unit ECU instructs display of "there is tire risk in the specified location" and "recommended path Xx". The instrument panel display unit ID displays "there is tire risk in the specified location" and "recommended path Xx". In step 214 of FIG. 6, the microcomputer of the electronic control unit ECU instructs display of "there is no tire risk in the specified location" and "recommended path Xx". The instrument panel display unit ID displays "there is no tire risk in the specified location" and "recommended path Xx". In step 215, the microcomputer of the electronic control unit ECU ends execution of the program.

In summary, in this embodiment, from the tire risk judged result in the specified location obtained by executing step 208 of FIG. 6, the tire risk in the specified location can be judged. From the judged result of "there is tire risk in the specified location" displayed on the instrument panel display unit ID, it is possible to notify the driver that the tire B2 is required to be repaired immediately before the vehicle reaches the specified location from the present location. From the judged result of "there is no tire risk in the specified location" displayed on the instrument panel display unit ID, it is possible to notify the driver that the tire B2 is not required to be repaired until the vehicle reaches the specified location from the present location. Repair of the tire B2 for avoiding tire risk can be performed with good timing.

In this embodiment, from the tire risk judged result in the present location obtained by executing step 203 of FIG. 6, the tire risk in the present location can be judged. From the tire risk judged result in the specified location obtained by executing step 208 of FIG. 6, the tire risk in the specified location can be judged. From the judged results of "there is tire risk in the specified location" and "there is tire risk in the present location" displayed on the instrument panel display unit ID, it is possible to notify the driver that the tire B2 is required to be repaired immediately in the present location.

From the judged results of "there is no tire risk in the specified location" and "there is no tire risk in the present location" displayed on the instrument panel display unit ID, it is possible to notify the driver that the tire B2 is not required to be repaired. From the judged results of "there is tire risk in the specified location" and "there is no tire risk in the present location" displayed on the instrument panel display unit ID, it is possible to notify the driver that the tire B2 is required to be repaired while the vehicle reaches the specified location from the present location. From the judged results of "there is no tire risk in the specified location" and "there is tire risk in the present location" displayed on the instrument panel display unit ID, it is possible to notify the driver that the tire B2 is required to be repaired and that the tire B2 is not required to be repaired until the vehicle reaches the specified location from the present location.

In this embodiment, steps 213 and 214 of FIG. 6 are executed to display "recommended path Xx" on the instrument panel display unit ID. The recommended path Xx is a path (one of the X1 to X6) in which the air pressure (Ps1 to Ps6) of the tire air chamber Rb is largest when the vehicle drives from the present location to the specified location. It is possible to drive from the present location to the specified location via the path in which the tire risk degree in the specified location is lowest, that is, the recommended path Xx.

In the above embodiment, in the gas state equation in step 103 of FIG. 4, the volume of the air pressure system including the tire air chamber Rb is the constant value (Vo). This may be a volume (V) changed according to the air pressure (P) and the air temperature (T) of the tire air chamber Rb. In this case, the residual air weight M, the leakage airflow rate Mr, and the supply airflow rate Mp in the air pressure system can be computed at higher accuracy as compared with the above embodiment. In embodying the present invention, the air temperature (T) of the above embodiment is the constant value (To) and the residual air weight M, the leakage airflow rate Mr, and the supply airflow rate Mp in the air pressure system can be simply computed. In this case, the temperature sensor S2 is unnecessary so that the tire risk judging device of a wheel assembly for a vehicle can be simplified.

In the above embodiment, various judged results are displayed on the instrument panel display unit ID to be notified to the driver (occupant). The judged results may be notified to the driver (occupant) by voice through a speaker. In the above embodiment, the air pressure-generating device A is driven by rotation of the wheel assembly B. The air pressure-generating device may be driven by an electric motor.

In the above embodiment, the loads applied on the tire B2 (the tire load coefficients Kb1 to Kb6) are computed based on the straight road proportions α1 to α6 of the paths X1 to X6. They may be computed based on the curved road proportion (the total distance of the curved road/the overall distance of the path) and the vehicle total weight including a payload of the vehicle.

The invention claimed is:

1. A tire risk judging device of a wheel assembly for a vehicle, comprising:
a pressure sensor that detects air pressure of a tire air chamber of the wheel assembly of the vehicle;
an air pressure-generating device that supplies pressurized air to the tire air chamber;
supply airflow rate computation means for computing a supply airflow rate supplied from the air pressure-generating device to the tire air chamber when the vehicle drives from a present vehicle location to a specified vehicle location on a particular path;
leakage airflow rate computation means for computing a leakage airflow rate leaked from the tire air chamber when the vehicle drives from the present vehicle location to the specified vehicle location on the particular path;
tire air pressure computation means for computing air pressure of the tire air chamber when the vehicle is located in the specified vehicle location based on air pressure of the tire air chamber when the vehicle is located in the present vehicle location detected by the pressure sensor, the supply airflow rate computed by the supply airflow rate computation means, and the leakage airflow rate computed by the leakage airflow rate computation means; and
specified location tire risk judgment means for judging tire risk in the specified vehicle location based on the air pressure of the tire air chamber when the vehicle is located in the specified vehicle location computed by the tire air pressure computation means.

2. The tire risk judging device of a wheel assembly for a vehicle according to claim 1, further comprising:
present location tire risk judgment means for judging tire risk in the present vehicle location based on the air pressure of the tire air chamber when the vehicle is located in the present vehicle location detected by the pressure sensor.

3. The tire risk judging device of a wheel assembly for a vehicle according to claim 1, further comprising:
specified location tire risk notification means for notifying an occupant of tire risk in the specified vehicle location judged by the specified location tire risk judgment means.

4. The tire risk judging device of a wheel assembly for a vehicle according to claim 2, further comprising:
present location tire risk notification means for notifying an occupant of tire risk in the present vehicle location judged by the present location tire risk judgment means.

5. The tire risk judging device of a wheel assembly for a vehicle according to claim 2, further comprising:
present location tire risk notification means for notifying the occupant of tire risk in the present vehicle location judged by the present location tire risk judgment means; and
specified location tire risk notification means for notifying the occupant of tire risk in the specified vehicle location judged by the specified location tire risk judgment means.

6. The tire risk judging device of a wheel assembly for a vehicle according to claim 1, wherein the air pressure-generating device is driven by rotation of the wheel assembly.

7. The tire risk judging device of a wheel assembly for a vehicle according to claim 1, further comprising:

tire load computation means for computing a load applied on the tire of the wheel assembly when the vehicle drives from the present vehicle location to the specified vehicle location on the particular path; and tire risk correction means for correcting the tire risk judged by the specified location tire risk judgment means according to the tire load computed by the tire load computation means.

8. The tire risk judging device of a wheel assembly for a vehicle according to claim 1, wherein the particular path is one path selected from plural predetermined paths.

9. The tire risk judging device of a wheel assembly for a vehicle according to claim 8, further comprising:

different path supply airflow rate computation means for computing a supply airflow rate supplied from the air pressure-generating device to the tire air chamber when the vehicle drives from the present vehicle location to the specified vehicle location on a path different from the particular path;

different path leakage airflow rate computation means for computing a leakage airflow rate leaked from the tire air chamber when the vehicle drives from the present vehicle location to the specified vehicle location on the path different from the particular path;

different path tire air pressure computation means for computing air pressure of the tire air chamber when the vehicle is in the specified vehicle location based on air pressure of the tire air chamber when the vehicle is the present vehicle location detected by the pressure sensor, the supply airflow rate computed by the different path supply airflow rate computation means, and the leakage airflow rate computed by the different path leakage airflow rate computation means; and recommended path notification means for selecting a path having the lowest tire risk degree in the specified vehicle location based on the air pressures computed by the different path tire air pressure computation means and the tire air pressure computation means and for notifying the occupant of the path having the lowest tire risk degree in the specified vehicle location.

10. The tire risk judging device of a wheel assembly for a vehicle according to claim 1, further comprising:

an on-board navigation device that computes a plurality of paths between the present vehicle position and the specified vehicle position and computes a plurality of distances that correspond to each of the plurality of paths.

11. The tire risk judging device of a wheel assembly for a vehicle according to claim 10, further comprising:

comparison path supply airflow rate computation means for computing a supply airflow rate supplied from the air pressure-generating device to the tire air chamber when the vehicle drives from the present vehicle location to the specified vehicle location on each of the plurality of paths;

comparison path leakage airflow rate computation means for computing a leakage airflow rate leaked from the tire air chamber when the vehicle drives from the present vehicle location to the specified vehicle location on each of the plurality of paths;

comparison path tire air pressure computation means for computing air pressures of the tire air chamber when the vehicle is in the specified vehicle location based on air pressure of the tire air chamber when the vehicle is the present vehicle location detected by the pressure sensor, the supply airflow rates computed by the comparison path supply airflow rate computation means, and the leakage airflow rates computed by the different path leakage airflow rate computation means; and recommended path notification means for selecting a recommended path of the plurality of paths having the lowest tire risk degree in the specified vehicle location based on the air pressures computed by the comparison path tire air pressure computation means and the comparison tire air pressure computation means, wherein the recommended path notification means notifies the occupant of the recommended path.

12. A tire risk judging device of a wheel assembly for a vehicle, comprising:

a pressure sensor that detects air pressure of a tire air chamber of the wheel assembly of the vehicle;

an air pressure-generating device that supplies pressurized air to the tire air chamber;

a supply airflow rate computation device that computes a supply airflow rate supplied from the air pressure-generating device to the tire air chamber when the vehicle drives from a present vehicle location to a specified vehicle location on a particular path;

a leakage airflow rate computation device that computes a leakage airflow rate leaked from the tire air chamber when the vehicle drives from the present vehicle location to the specified vehicle location on the particular path;

a tire air pressure computation device that computes air pressure of the tire air chamber when the vehicle is located in the specified vehicle location based on air pressure of the tire air chamber when the vehicle is located in the present vehicle location detected by the pressure sensor, the supply airflow rate computed by the supply airflow rate computation device, and the leakage airflow rate computed by the leakage airflow rate computation device; and a specified location tire risk judgment device that judges tire risk in the specified vehicle location based on the air pressure of the tire air chamber when the vehicle is located in the specified vehicle location computed by the tire air pressure computation means.

13. The tire risk judging device of a wheel assembly for a vehicle according to claim 12, further comprising:

an on-board navigation device that computes a plurality of paths between the present vehicle position and the specified vehicle position and computes a plurality of distances that correspond to each of the plurality of paths.

14. The tire risk judging device of a wheel assembly for a vehicle according to claim 13, further comprising:

a comparison path supply airflow rate computation device that computes a supply airflow rate supplied from the air pressure-generating device to the tire air chamber when the vehicle drives from the present vehicle location to the specified vehicle location on each of the plurality of paths;

a comparison path leakage airflow rate computation device that computes a leakage airflow rate leaked from the tire air chamber when the vehicle drives from the present vehicle location to the specified vehicle location on each of the plurality of paths;

a comparison path tire air pressure computation device that computes air pressures of the tire air chamber when the vehicle is in the specified vehicle location based on air pressure of the tire air chamber when the vehicle is the present vehicle location detected by the pressure sensor, the supply airflow rates computed by the comparison path supply airflow rate computation device, and the leakage airflow rates computed by the different path leakage airflow rate computation device; and a recommended path notification device that selects a recommended path of the plurality of paths that has the lowest tire risk degree in the specified vehicle location based on the air pressures computed by the comparison path tire air pressure computation device and the comparison tire air pressure computation device, wherein the recommended path notification device notifies the occupant of the recommended path.

* * * * *